(12) United States Patent
Brown, Jr. et al.

(10) Patent No.: US 11,434,102 B2
(45) Date of Patent: Sep. 6, 2022

(54) CORE SLABBING APPARATUS

(71) Applicant: Applied Motion Systems, Inc., Vancouver, WA (US)

(72) Inventors: Howard Kenneth Brown, Jr., Yacolt, WA (US); Michael A Asseth, Vancouver, WA (US)

(73) Assignee: Applied Motion Systems, Inc., Vancouver, WA (US)

( * ) Notice: Subject to any disclaimer, the term of this patent is extended or adjusted under 35 U.S.C. 154(b) by 0 days.

(21) Appl. No.: 16/559,398

(22) Filed: Sep. 3, 2019

(65) Prior Publication Data

US 2021/0061611 A1    Mar. 4, 2021

(51) Int. Cl.
 *B65H 73/00* (2006.01)
 *B26D 7/26* (2006.01)
 *B26D 1/18* (2006.01)

(52) U.S. Cl.
 CPC ............... *B65H 73/00* (2013.01); *B26D 1/18* (2013.01); *B26D 7/2635* (2013.01)

(58) Field of Classification Search
 CPC .......... B65H 73/00; B26D 1/18; B26D 7/2635
 See application file for complete search history.

(56) References Cited

U.S. PATENT DOCUMENTS

| | | | | |
|---|---|---|---|---|
| 2,916,956 A | * | 12/1959 | Salomon | B26D 1/626 83/163 |
| 6,766,722 B2 | * | 7/2004 | Plasswich | B26D 1/185 83/304 |
| 2009/0084239 A1 | * | 4/2009 | Yu Chen | B26D 1/065 83/471.2 |

* cited by examiner

*Primary Examiner* — Omar Flores Sanchez
(74) *Attorney, Agent, or Firm* — Lee & Hayes, P.C.

(57) ABSTRACT

An apparatus and method for removing sheet or web material from a roll employs an at least partially hollow cutting tube that rotates against a cull roll. The cutting tube has a slot along some of the length of the tube and carries a blade that is extendable from the slot. As the slot positions against the cull roll, the blade is extended and translated along the length of the slot to cut the material away from the roll.

14 Claims, 5 Drawing Sheets

US 11,434,102 B2

CORE SLABBING APPARATUS

REFERENCE TO RELATED APPLICATIONS

Not Applicable

STATEMENT OF GOVERNMENT INTEREST

Not applicable.

TECHNICAL FIELD OF THE DISCLOSURE

The present disclosure relates in general to manufacture of sheet or web materials. The disclosure relates in particular to apparatus and processes for removing paper or web materials from a core, known as core slabbing.

DISCUSSION OF BACKGROUND

This application relates to another approach for handling rolls of sheet or web materials. Many manufacturing products require the use of sheet or web materials that are wound on hollow cores and stored as a roll for future use. During the manufacture of these rolls it is common to have damage, impurities, or other defects that make the roll unusable, or, once the amount of material left on a roll falls below a certain amount, further use is not practical. In such cases, it is economically and environmentally preferable to remove the wound material from the hollow core, in a process called core slabbing, whereby the removed material can be recycled and made into new product or otherwise disposed of. It is also preferable to not damage the hollow core during such removal and to save the undamaged hollow core for re-use.

One common practice for removing the wound material from the roll is to locate the unusable roll at a location on a factory floor. At this station a worker uses a manual cutting tool to remove the layers of wound product from the core. However, cutting too deeply can damage the core and render it unusable. Also, workers can be exposed to potential injury from the cutting tools as a result of fatigue or mistake, or workers can be subject to repetitive motion or other injuries as a result of poor ergonomics of the process. There is also a possibility of crush injuries to workers when manually removing the material as the cull rolls can be large, with typical core sizes of between 6 to 20 inches outer diameter and a roll being multiple feet or yards long and up to and more than 120 inches in diameter, weighing thousands of pounds.

As such, an improved and safer solution is desirable. But, the factory area available for performing core slabbing may be limited in an industrial plant, so any such solution needs to be able to fit into a relatively small area within a facility in terms of floor space and/or ceiling height and ideally located near the recycling apparatus to introduce the removed paper waste into a pulping process.

SUMMARY OF THE DISCLOSURE

Disclosed herein is an apparatus and methods for core slabbing comprising a cutting tube that supports some or all of the weight of a material roll. The roll is chucked and the tube and roll rotate together. One or more cutting blades are contained within the tube and are extensible through a cutting slot beyond the exterior surface of the cutting tube and translate along the roll so as to cut the material from the roll.

BRIEF DESCRIPTION OF THE DRAWINGS

The accompanying drawings, which are incorporated in and constitute a part of the specification, illustrate preferred methods and embodiments of the present disclosure. The drawings together with the general description given above and the detailed description of preferred methods and embodiments given below, serve to explain principles of the present disclosure.

DETAILED DESCRIPTION OF THE DISCLOSURE

Figure 1:
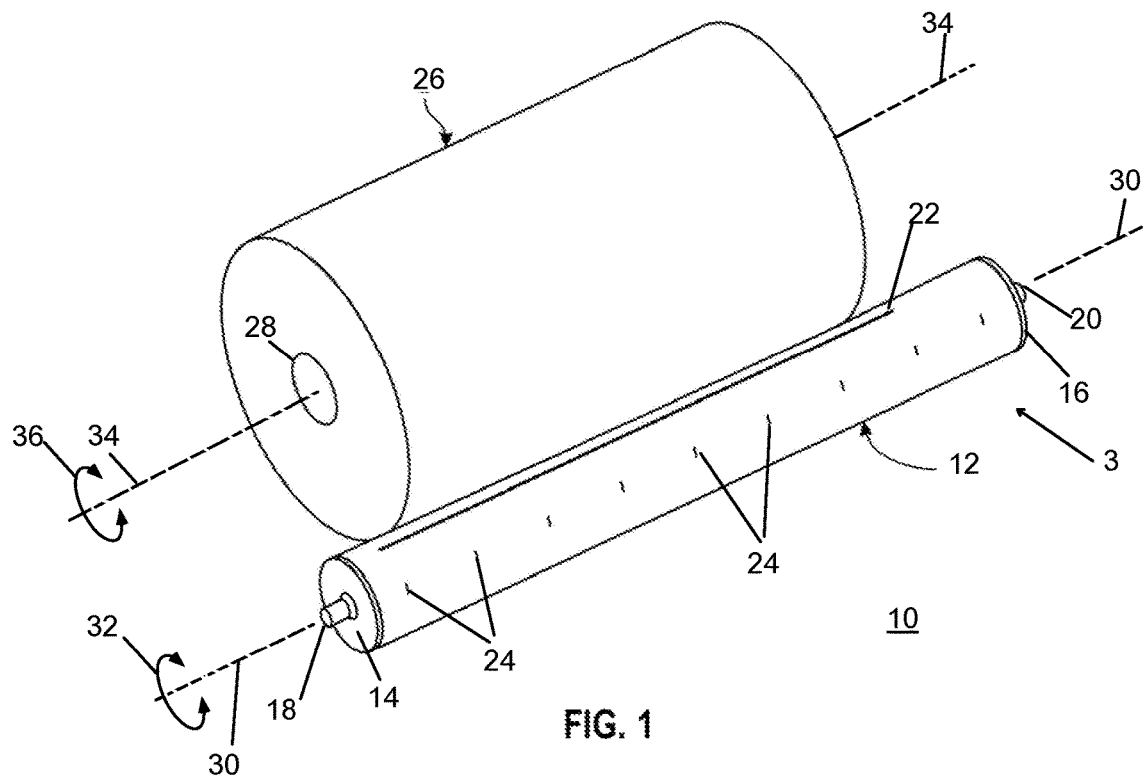
FIG. 1 is a perspective view of a core slabbing apparatus in use in accordance with the disclosure.

Referring now to the drawings, wherein like components are designated by like reference numerals. Methods and embodiments of the present disclosure are described further herein.

Herein, a roll with paper or webbing material wound about the core is referred to as a cull roll, parent roll, a partial roll, a butt roll or combinations thereof. As would be understood by one skilled in the art, a variety of terms could be used to describe such an article. It is to be understood that the disclosure below is not limited to any specific term of art for the roll containing paper or webbing material.

Referring to FIG. 1, a perspective view of a core slabbing apparatus 10, the apparatus comprises an elongate substantially hollow cylindrical cutting tube 12 having a left and a right end caps 14, 16 that support a rotary mounting shaft 18 and 20. A cutting slot 22 extends a substantial portion of the length of the cutting tube, typically being at least as long, or longer than the width of any material roll that is to be processed with the apparatus. A plurality of countersunk holes 24 allow the cutting tube 12 to bolt to a plurality of U-shaped members 38 (FIG. 2) via attachment tabs 48 (FIG. 2) to assemble the cutting tube 12. Here, the spacing is regular although in other embodiments the positioning can be irregular.

In use, a cull roll 26 of material wound about a core 28 is positioned against cutting tube 12. Cutting tube 12 is mountable for rotation 32 about axis 30 while cull roll 26 is mountable for rotation 36 about axis 34. As the cutting tube rotates, at some point during a rotation, cutting slot 22 will be positioned against the face of the cull roll 26, at which time a cutting blade may be extended out of the cutting tube through the cutting slot and moved along the length of the cutting slot, to cut the material on the cull roll. The cutting blade can be aligned parallel to the cull roll as disclosed or at a slight oblique angle. In a typical process the cull roll rotation is paused during the cut. In other processes the cull roll rotation is slowed during cutting.

Figure 2:
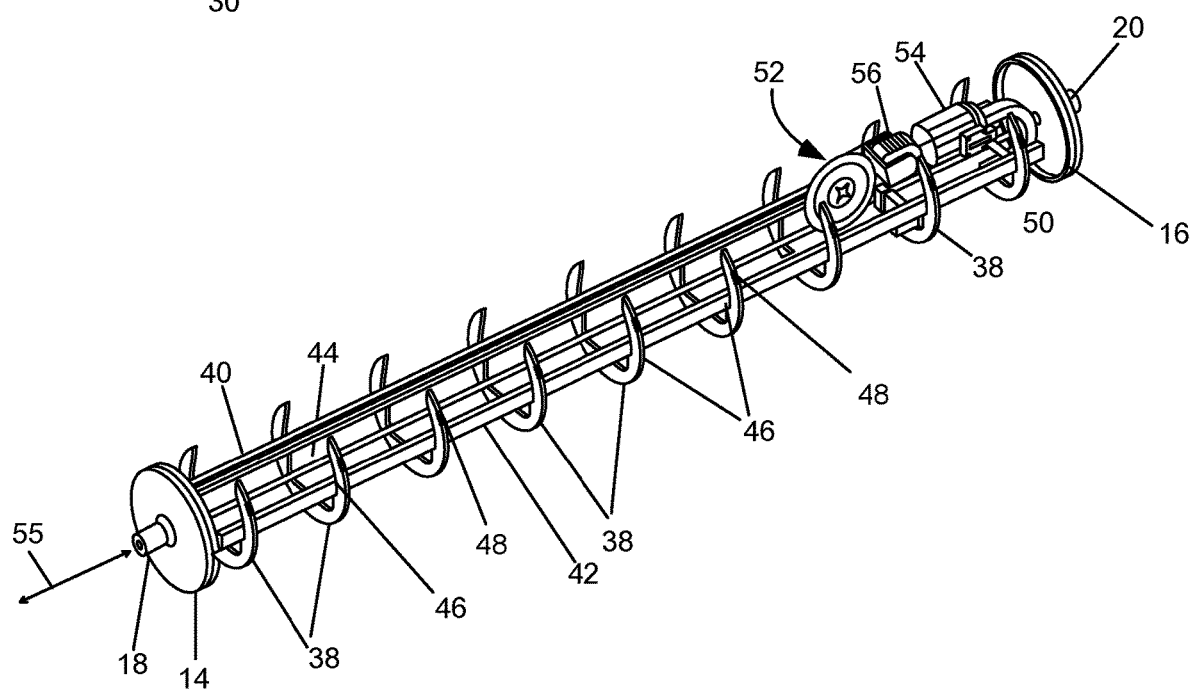
FIG. 2 is a perspective view of the interior of the cutting tube, with the exterior shell removed.

Referring now to FIG. 2, a perspective view of the interior of the cutting tube, with the exterior shell removed, multiple structural support members 38 are in spaced arrangement between left and right end caps 14 and 16, held in position by plural elongate structural support stays, left and right stays 40 and 42 being substantially larger cross sectional size than lower timing belt 44. The spacing of the support members may or may not be regular. The structural support members have a somewhat U-shape with open area in their respective centers, and have exterior surface profiles and dimensions matching the interior profile of cylindrical cutting tube 12. Interior seat portions 46 on the U-shaped rib members provide an engaging surface for interaction with and attachment to stays 42, 40.

Near the right end of the cutting tube structure in FIG. 2 is a laterally translatable carriage 50 that mounts a cutting blade 52, a rotation motor 54 and a blade spin gearbox 56. The inner face of left stay 40 has a bearing support rail (and there is a corresponding rail on stay 42). Accordingly, operation of rotation motor 54 and blade spin gearbox 56 rotates cutting blade 52. A drive pulley that interacts with timing belt 44 moves the blade carriage 50 along the length of the left stay and translates the blade carriage back and forth along the length of the left stay along the directions of arrow 55.

Figure 3:
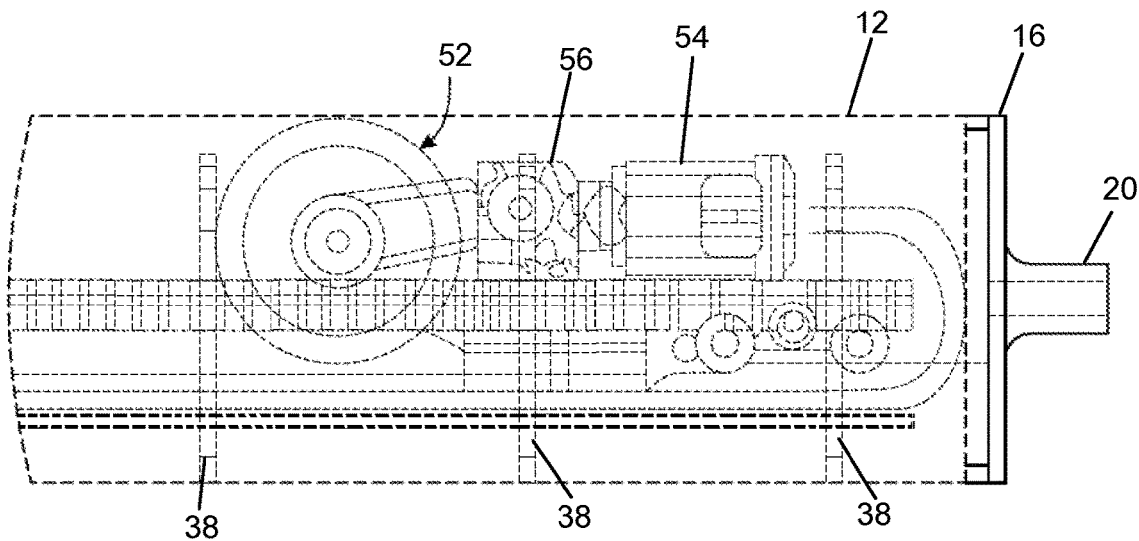
FIG. 3 is a partial side transparent view of the core slabbing apparatus taken in the direction of arrow 3 of FIG. 1, with the blade in a retracted position.
Figure 4:
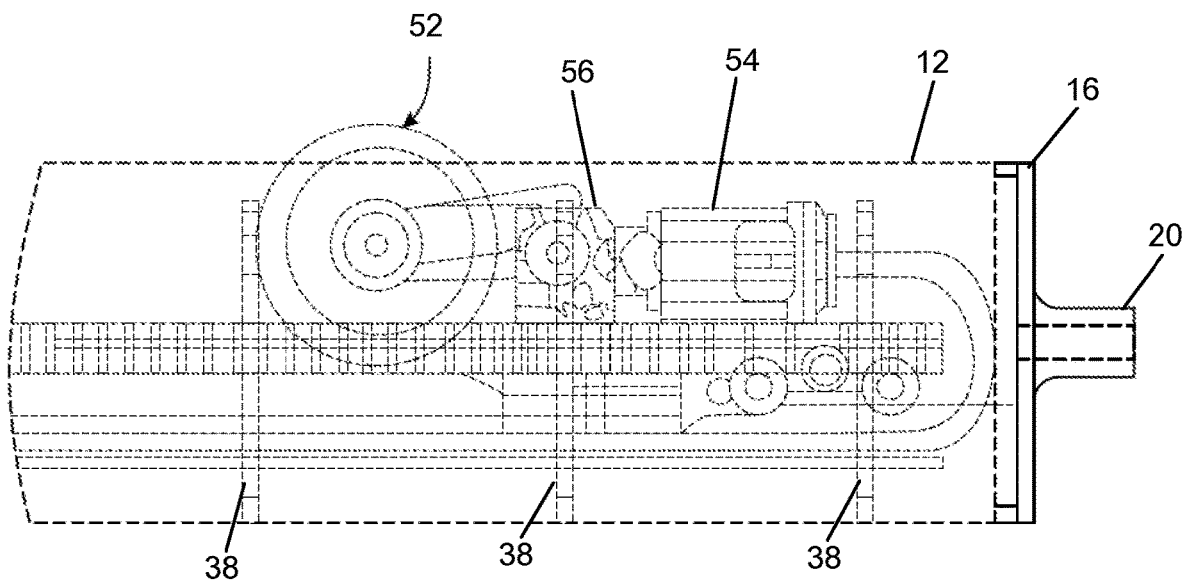
FIG. 4 is a partial side transparent view of the core slabbing apparatus of FIG. 3, with the blade in an extended position.

As may be observed in connection with FIGS. 3 and 4, partial side transparent views of the core slabbing apparatus taken in the direction of arrow 3 of FIG. 1, with the blade in a retracted position in FIG. 3, the cutting edge is maintained within the cutting tube 12 and does not extend beyond the external surface of the cutting tube. When extended, as in FIG. 4, the blade passes through cutting slot 22 and is available to cut through the material on the cull roll. To accomplish a cutting operation, the blade 52 is extended as in FIG. 4, and the rotation motor 54 is operated to translate the blade carriage 50 along the length of the cull roll, to cut the material.

The cutting blade is extendable and the cut depth can be chosen. In some applications the cut depth is chosen to be shallow or deep depending on material wound about the parent or partial roll. In addition, the cut depth can be chosen to cut the remaining material off without scoring the core. Knowledge of the remaining material relative to the core can be obtained by physical measurement, positional knowledge of the material based on encoded stages, or in situ metrology such as machine vision, or other form of sensors capable of measuring the overall diameter of the roll having material removed.

Figure 5:
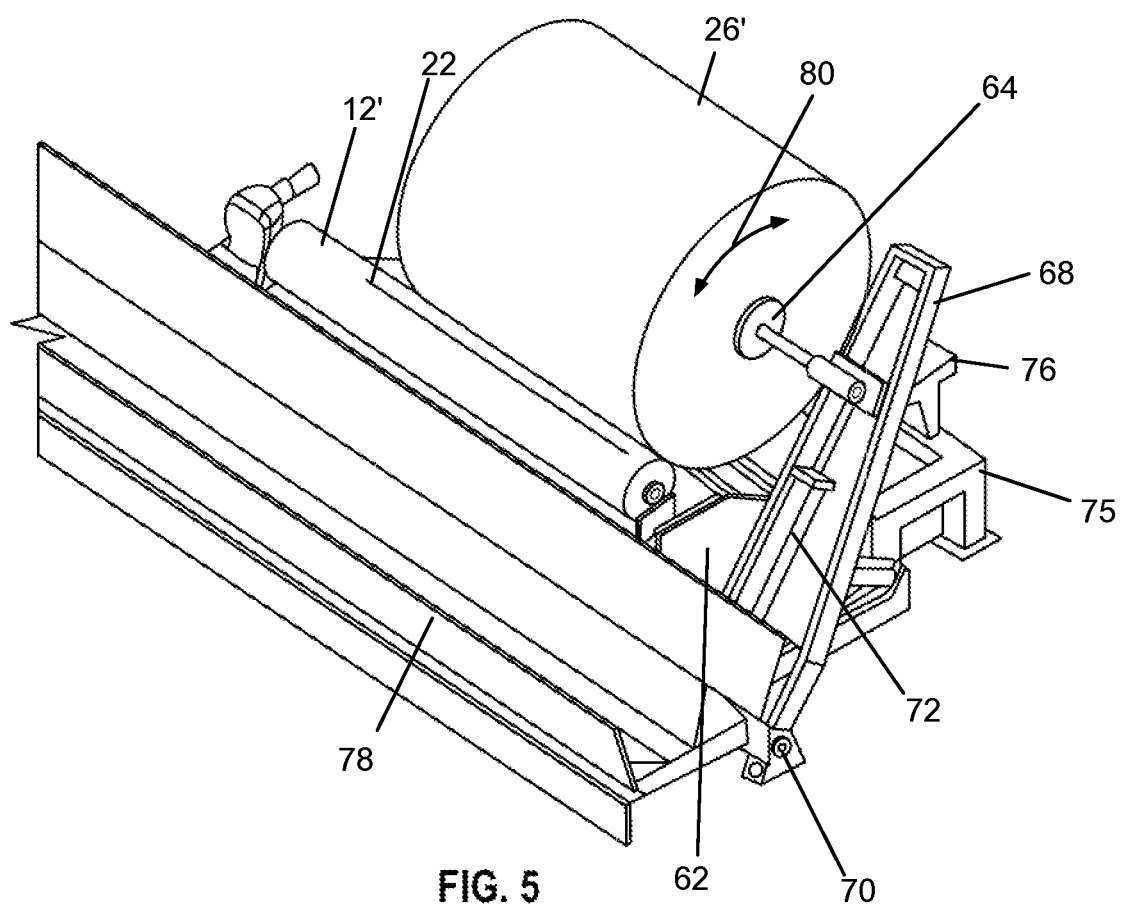
FIG. 5 is a front perspective view of a standalone core slabbing apparatus in accordance with the disclosure.
Figure 6:
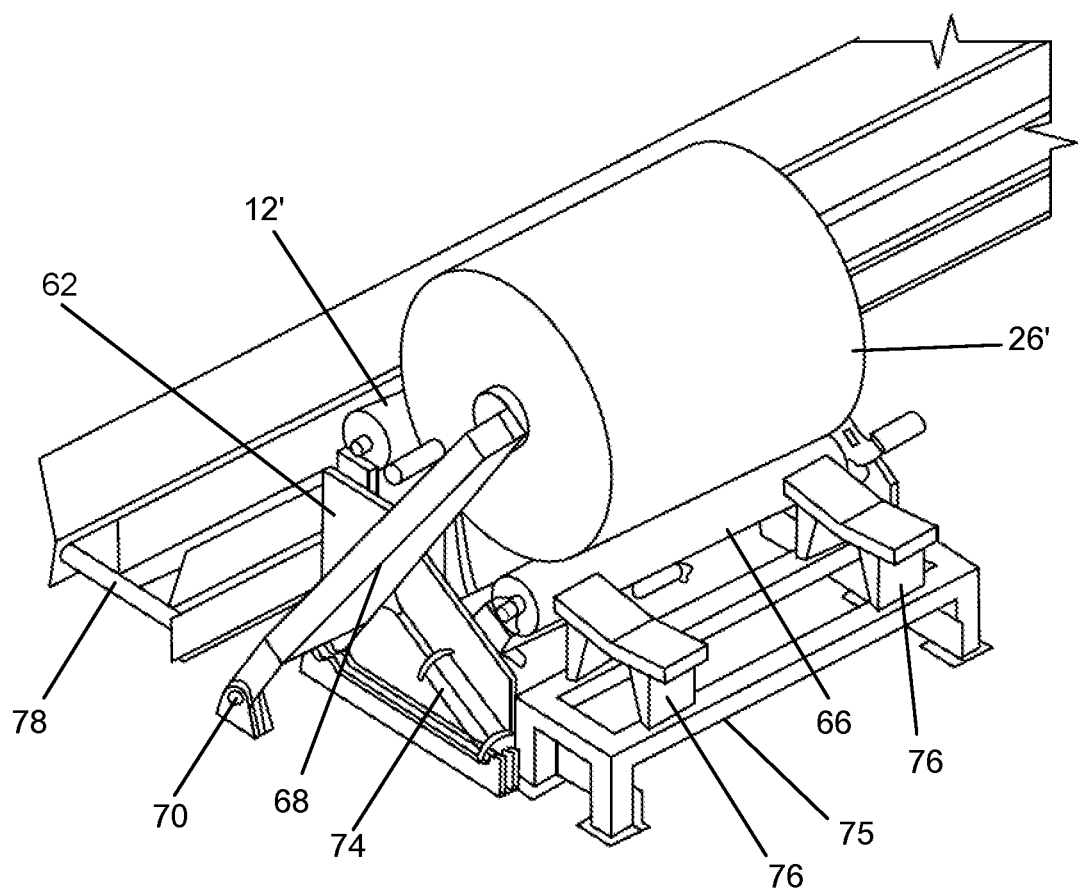
FIG. 6 is a rear perspective view of the core slabbing apparatus of FIG. 5.

Referring now to FIG. 5 and FIG. 6, front and rear perspective views of a stand-alone core slabbing apparatus and configuration in accordance with the disclosure, cutting tube 12' is mounted to a frame 62 for rotation, while cull roll 26' is rotationally supported against the cutting tube 12' by chucking mechanism 64 and support roll 66 and are also mounted to frame 62. The chucking mechanism 64 is carried by support arm 68 is pivotally mounted by pivot 70. The chucking mechanism can have a plurality of chuck sizes to accommodate different roll core sizes. In addition, the core chucking mechanism can have an expanding chuck. Actuator 72 raises and lowers the chucking mechanism for accommodating different roll sizes, while actuator 74 tilts the chucking mechanism support arm forwardly and backwardly about pivot 70 toward or away from the cutting tube and from a drop-off table 75. The drop-off table having a pair of roll support stands 76. A conveyor 78 is positioned at the opposite side of cutting tube 12' from where the cutting tube interacts with the cull roll, for receiving the material that will be cut from the cull roll.

In use, a cull roll is placed on the roll support stand 76, and, for example, would be brought to the roll support stand location by a lift truck. Actuators 72 and 74 are automated to move the chucking mechanism into position to mount to the core of the cull roll, and then are operated to move the core from the support stand into position on support roll 66 and cutting tube 12' such that the cull roll is positioned as in FIGS. 5 and 6. The support roll is designed to support most of the weight of the cull roll during processing. The cull roll is then rotated (as indicated by arrow 80) and as the cutting slot 22 is adjacent the surface of the cull roll 26', blade 52 may be extended (to the configuration of FIG. 4) and the blade carriage 50 is moved along the extent of the cutting tube (or at least along a sufficient extent to cut the entire width of the cull roll) so that the blade will cut through the material on the cull roll to the depth equal to the amount that the blade has been extended beyond the cutting tube surface. After the cutting operation, as the cull roll is rotated, the material on the cull roll will fall away from the roll, over the top of cutting tube 12', and on to conveyor 78, to be carried away from the cutting station for further processing. Further cutting may be performed in iterations, until the core is exposed. The cut away material may then be recycled, baled for later reprocessing or otherwise disposed of as appropriate for the particular material, and once the core is fully exposed, the core may be removed from the chucking mechanism and re-used.

Figure 7:
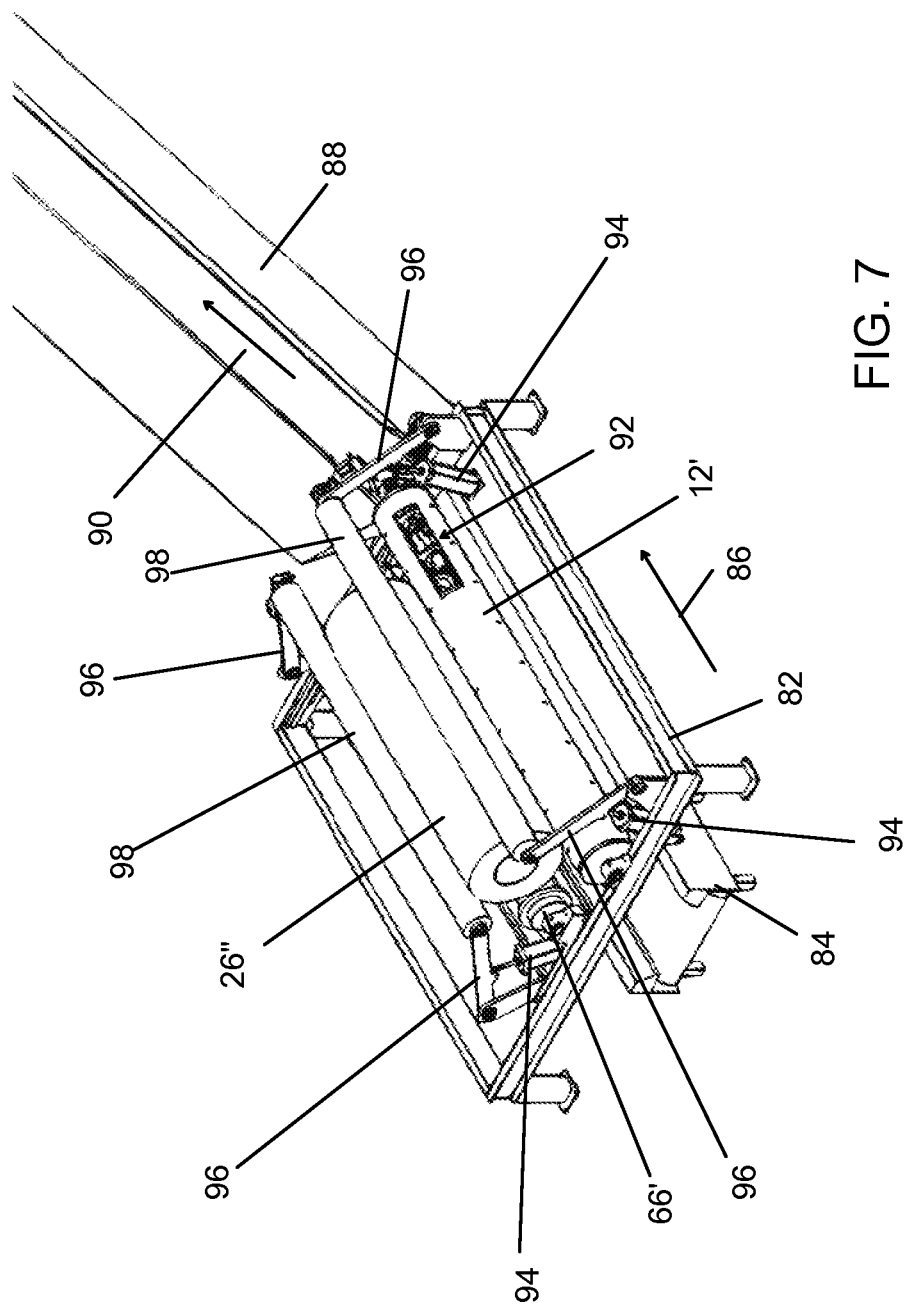
FIG. 7 is a perspective view of an alternative installation of a core slabbing apparatus.

Referring to FIG. 7, FIG. 7 provides a perspective view of an alternative installation of a core slabbing apparatus. Here, a support table 82 mounts the core slabbing apparatus over a conveyor 84 that carries the cut away material in the direction of arrow 86, towards a second conveyor 88 that transports the cut away material in the direction of arrow 90, away for further processing. Cylindrical cutting tube 12' in the illustrated configuration has an opening 92 that may be in the form of removable panels and allows access to the interior components for maintenance or repair. A support roll 66' is rotationally powered and supports a longitudinal edge of cull roll 26" while another edge of the cull roll is supported by cutting tube 12'. Actuators 94 connect to arms 96 and are pivotally mounted to the support table, distal ends of the arms rotationally mounting compression rollers 98.

In operation, the cull roll is placed to rotate on 66' and 12', and actuators 94 are retracted to pull compression rollers 98 into contact with the cull roll 26", ensuring good contact with the rotating support roll 66' so that the cull roll will rotate with the rotation of the support roll. The cutting device may then be operated with the rotation of cutting tube 12', whereby material is cut away from the cull roll, falling down onto conveyer 84, to be carried away by conveyor 84 and 88.

The operation of the device may be automated such that the roll is processed until sufficient material has been removed to allow access to the core.

Variations from the illustrated embodiment may be employed. For example, the blade in the illustrated embodiments is a circular blade, but other forms of blades can be employed. For example, a straight blade could be employed in place of the circular blade, or other non-blade cutting mechanisms may be used. Alternative cutting means could include lasers, water jets or air streams. The underlying effectiveness of cutting blade choice is so that the core does not become damaged in the application. In the application of this device for the removal of paper from rolls containing a cardboard core, removal of paper by water jet or laser means adversely impacts the underlying core. An air blade application is an alternative means to remove the paper from the rolls without damaging the core. The illustrated circular blade 52 can be rotationally mounted to rotate passively as it passes along the surface of the cull roll, or can be powered to rotate as it cuts for more aggressive cutting effect or to accommodate the requirements of the particular material on the cull roll. Instead of a conveyor to carry away the removed material, the device can be installed over a pit, pulper or bins wherein the removed roll material will fall. The chucking mechanism can be replaced with use of a rider roll to support and rotate the cull roll. Further, the cutting tube or the support roll can be passive or mechanized to rotate the rolls partially or fully mechanized to control the roll velocity and number of revolutions. The cutting tube can be positioned lower, at the same elevation as the support roll, and material being removed from the cull roll can then discharge downwardly between the cutting tube and the support roll. The translation of the blade carriage, the extension/retraction of the blade and other movements of the device and method can be driven by pneumatic, hydraulic or electric actuators. Since the cutting tube is rotatable, power and communication thereto may be provided by a slip ring configuration.

In accordance with the disclosure, an improved method and apparatus is provided for slabbing cores that can be automated, providing improved worker safety from potential repetitive motion injuries, lacerations and potential crush injuries, and freeing workers to perform other tasks. This improved method and apparatus will also reduce the risk of damage to the core through better control of the cutting blade compared to manual operation. The apparatus and method can be implemented in a small area.

From the description of the present disclosure provided herein one skilled in the art can implement the method of manufacture in accordance with the present invention. While the present invention has been described in terms of particular examples, others can be implemented without departing from the scope of the disclosure. In summary, the present invention is described above in terms of particular embodiments. The invention, however, is not limited to the embodiments described and depicted herein. Rather, the invention is limited only by the claims appended hereto.

What is claimed is:

1. A method of removing material from a full or partial parent roll, the method comprising:
   providing a cutting tube, the tube having an at least partially hollow area, the cutting tube having an outside cylindrical surface with having an opening along the length of the cutting tube, the cutting tube rotatable along its axis; the cutting tube having a blade, the blade located within the tube and extendable from the opening; wherein the blade is mechanized for translation longitudinally along the length of the opening;
   placing a full or partial parent roll in physical contact with the cutting tube; and
   rotating the full or partial parent roll and intermittently extending the blade from the cutting tube and cutting material from the cull roll.

2. The method of claim 1, wherein rotation of the full or partial parent roll is terminated before cutting material from the full or partial parent roll.

3. The method of claim 1, wherein rotation of the full or partial parent roll is slowed while cutting material from full or partial parent roll.

4. The method of claim 1, wherein the material cut from the full or partial parent roll drops onto a conveyor for material removal.

5. The method of claim 1, further comprising determining the amount of material left on the full or partial parent roll and the extending the blade to the depth of the remaining material.

6. A system for core slabbing a parent or partial roll, the system comprising:
   a cutting tube, the cutting tube having an at least partially hollow area, the tube having an outside cylindrical surface with having an opening along the length of the tube, the cutting tube rotatable along its axis; a blade, the blade located within the tube and extendable from the opening; wherein the blade is mechanized for translation longitudinally along the length of the opening; and
   a means of rotating a partial or parent roll wherein the partial or parent roll is in physical contact with the cutting tube.

7. The system of claim 6, further comprising a conveyor mounted in proximity to the cutting tube.

8. The system of claim 6, wherein the means of rotating the partial or parent roll is a lower support roll, the lower support roll in physical proximity to the cutting roll.

9. The system of claim 8, wherein the lower support roll is mechanized to move closer or further from the cutting tube.

10. The system of claim 8, wherein the lower support roll and cutting tube supports the weight of a cull roll.

11. The system of claim 8, wherein the lower support roll supports more weight of the cull roll than the cutting tube.

12. The system of claim 6, further comprising a chucking mechanism, the chucking mechanism having a chuck to pick up the partial or parent roll, the chucking mechanism mounted in proximity to the cutting tube such that the partial or parent roll can be placed with reach of the blade.

13. The system of claim 12, wherein the core chucking mechanism has a plurality of chuck sizes.

14. The system of claim 12, wherein the core chucking mechanism has an expanding chuck.

* * * * *

UNITED STATES PATENT AND TRADEMARK OFFICE
CERTIFICATE OF CORRECTION

| | | |
|---|---|---|
| PATENT NO. | : 11,434,102 B2 | Page 1 of 1 |
| APPLICATION NO. | : 16/559398 | |
| DATED | : September 6, 2022 | |
| INVENTOR(S) | : Howard K. Brown, Jr. et al. | |

It is certified that error appears in the above-identified patent and that said Letters Patent is hereby corrected as shown below:

On the Title Page

Item (72), change:
"Howard Kenneth Brown , Jr. , Yacolt, WA (US);
Michael A Asseth, Vancouver, WA (US)"

To:
--Howard K. Brown, Jr., Yacolt, WA (US);
Michael A Aaseth, Vancouver, WA (US);
Andrew D. Drummond, Vancouver, WA (US)--

Signed and Sealed this
Sixth Day of June, 2023

Katherine Kelly Vidal
*Director of the United States Patent and Trademark Office*